(12) United States Patent
Koiwai et al.

(10) Patent No.: US 6,388,825 B1
(45) Date of Patent: May 14, 2002

(54) SUPPORT STRUCTURE FOR POSITIONING LENS ON RETENTION FRAME (75) Inventors: Tamotsu Koiwai, Akiruno (JP); Shinya Takahashi, Happy Valley (HK)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/602,384

(22) Filed: Jun. 22, 2000

(30) Foreign Application Priority Data

Jun. 28, 1999 (JP) .......................................... 11-181601
Jun. 28, 1999 (JP) .......................................... 11-181602

(51) Int. Cl.$^7$ ................................................ G02B 7/02
(52) U.S. Cl. ...................................... 359/819; 359/811
(58) Field of Search ................................ 359/819, 642, 359/696, 811

(56) References Cited

U.S. PATENT DOCUMENTS

| 5,262,899 A | * | 11/1993 | Izuka | 359/811 |
| 5,561,561 A | * | 10/1996 | Fukino | 359/696 |
| 5,798,876 A | * | 8/1998 | Nagano | 359/819 |
| 6,052,232 A | * | 4/2000 | Iwaki | 359/642 |

FOREIGN PATENT DOCUMENTS

| JP | 58-158615 | 9/1983 |
| JP | 59-68710 | 4/1984 |

* cited by examiner

Primary Examiner—Georgia Epps
Assistant Examiner—Gary O'Neill
(74) Attorney, Agent, or Firm—Frishauf, Holtz, Goodman, Langer & Chick, P.C.

(57) ABSTRACT

A support structure is provided wherein a fitting backlash is provided between a lens and a retaining frame to enable positioning of the lens while restraining degradation of optical performance even if the lens shifts. The lens has two opposed optical characteristic surfaces. A first one of the optical characteristic surfaces is formed of a spherical surface, while the other has a spherical portion that is annularly formed in a periphery thereof and that has the same center as the spherical surface of the first one of the optical characteristic surfaces. When abutted on an inner circumferential end of the retaining frame, the spherical portion is correctly aligned and supported on an optical axis of an optical system (see FIG. 2).

17 Claims, 5 Drawing Sheets

SUPPORT STRUCTURE FOR POSITIONING LENS ON RETENTION FRAME

CROSS-REFERENCE TO RELATED APPLICATIONS

This application is based upon and claims the benefit of priority from the prior Japanese Patent Applications No. 11-181601 now Japanese Patent 2001-013392, filed Jun. 28, 1999; and No. 11-181602 now Japanese Patent 2001-013390, filed Jun. 28, 1999, the entire contents of which are incorporated herein by reference.

BACKGROUND OF THE INVENTION

The present invention relates to an optical element and in particular, to a lens shape and a lens frame for retaining the lens.

When a plurality of lenses are arranged in a cylindrical lens barrel using a lens frame, the performance of this lens optical system heavily depends on a designed centering accuracy for the lens and the lens frame and a positioning accuracy with which these lenses are supported and fixed via the lens frame in such a manner that each lens is centered on an optical axis.

With respect to techniques for optical lenses, an approach for mounting the lenses in the lens barrel with a resin while aligning them on the optical axis using, for example, the "bell chuck method" has been proposed in Jpn. Pat. Appln. KOKAI Publication No. 59-68710 as an example of a method for assembling a lens system.

In addition, techniques for improving the surface shape of the lenses and applying a frame member that contacts with the lens surfaces include a lens retaining mechanism such as that disclosed in Jpn. Pat. Appln. KOKAI Publication No. 58-158615, which is one of retaining techniques for reducing aberrations resulting from inclination of the lenses with respect to the optical axis.

These conventional techniques improve the lenses or the lens frame in order to correctly position the lenses.

The above described improvements can simplify or omit a lens "centering" step to improve an assembly operation or optical performance to some degree. To correctly position the lens on the lens frame, however, the assembly method in Jpn. Pat. Appln. KOKAI Publication No. 59-68710 provides a radial gap in an inner diameter of the lens frame so as to enable adjustments called "alignments" while supporting the lens on its predetermined spherical surface based on, for example, the bell chuck method. Accordingly, the lens may shift within a range corresponding to the predetermined amount of backlash (fitting backlash), so that shifting of the spherical surface, which is in abutment with the lens frame, may degrade the performance of the optical system.

The lens retention mechanism disclosed in Jpn. Pat. Appln. KOKAI Publication No. 58-158615 may cause what is called "parallel decentering" in a direction orthogonal with the optical axis. This lens decentering may also degrading the performance of the optical system.

Thus, the prior art has disclosed no techniques for initial positioning or maintenance of initial positioning accuracy or easy positioning techniques that can be achieved while maintaining a designed accuracy.

Many typical lenses are supported at their peripheral or spherical surface. If, however, a lens, comprising a plurality of spherical surfaces, is supported at part of its optical characteristic surface (for example, an end surface of the lens close to its periphery), then in order to enhance a mounting accuracy for a main optical characteristic surface (a first spherical surface) that is important in terms of performance, improvements are required to prevent the first spherical surface from shifting from the optical axis even if a supported position on the supported surface is displaced by a certain amount within this surface.

It is thus an object of the present invention to provide a support structure comprising a lens and a lens frame and which provides fitting backlash between the lens and the lens frame to enable positioning while restraining degradation of optical performance even if the lens shifts.

BRIEF SUMMARY OF THE INVENTION

To solve the above described problems to attain the object, the present invention provides the following means:

According to the present invention, if a lens is supported at its end surface close to its periphery which is adjacent to its optical characteristic surface constituting, for example, a spherical surface, then in order to enhance a mounting accuracy for a main optical characteristic surface (a first spherical surface), the lens is shaped to be supported at a spherical surface having the same center as the first spherical surface (the center of the first spherical surface is hereafter simply referred to as the "center"), that is, at a "concentric spherical surface".

For example, a first invention provides a lens comprising two opposed optical characteristic surfaces, wherein one of the two optical characteristic surfaces is formed, for example, of a spherical surface, while the other has a spherical surface annularly formed in a peripheral portion thereof and having the same center as the first optical characteristic surface.

This invention also proposes a lens having its center on an optical axis and comprising two spherical surfaces, wherein one of the spherical surfaces comprises a spherical surface annularly formed in a peripheral portion thereof and having the same center as the other spherical surface.

This invention also proposes a lens comprising a first optical characteristic surface, a second optical characteristic surface including a spherical surface opposed to the first optical characteristic surface, and a spherical portion formed contiguously to the first optical characteristic surface in a surrounding fashion and having the same spherical center as the second optical characteristic surface.

In addition, according to this invention, if a lens is supported inside a lens frame comprising, for example, a spherical surface, then in order to improve a mounting accuracy for a main optical characteristic surface (a first spherical surface or a second spherical surface) of the lens, the lens frame is shaped so as to be coaxially supported by having the same center as the first spherical surface or the second spherical surface.

For example, a second invention proposes a lens frame wherein a surface for receiving a lens for support and retention is spherical.

This invention also proposes a lens frame comprising a frame member having a spherical shape for receiving one of two opposed spherical surfaces of a lens to support and retain the lens.

This invention also proposes a lens frame comprising, to support a circular lens with two opposed spherical surfaces, an annular frame member using as a lens receiving surface a spherical surface that receives one of the spherical surfaces of the lens and that has the same center as the other spherical surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION (First Embodiment)

Figure 1:
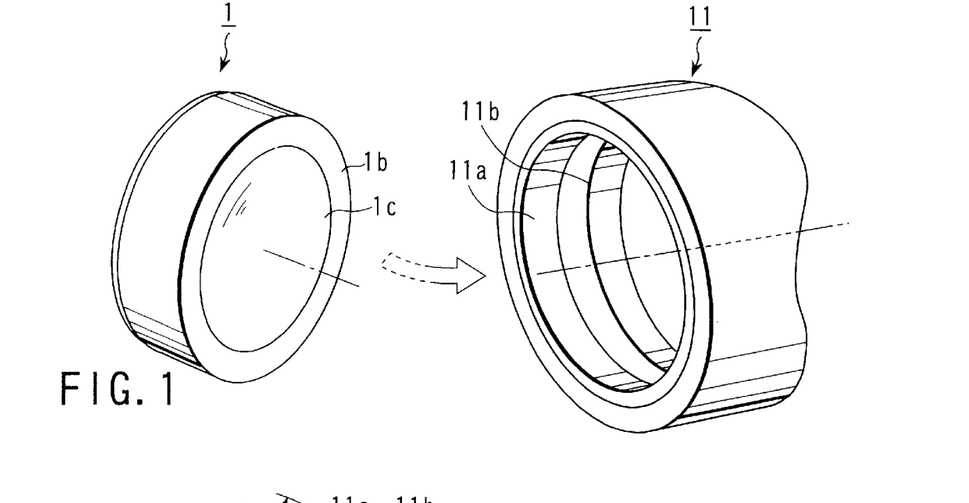
FIG. 1 is a perspective view showing a lens as a first embodiment of the present invention, and a lens frame for retaining the lens.

FIG. 1 illustrates a set of optical elements comprising a lens 1 according to a first embodiment of the present invention and a retaining frame (a lens frame, hereafter simply referred as a "frame") 11.

The lens 1 has two optical characteristic surfaces (a lens surface 1c and a lens surface 1a (not shown)) constituting front and rear surfaces of the lens and which are designed to have different points (not shown) on an optical axis as their centers. One 1c of the optical characteristic surfaces has a spherical portion 1b annularly formed and having a center that is different from that of the optical characteristic surface 1c but that is the same as the other optical characteristic surface (1a).

The lens 1, which is characteristically shaped as illustrated, is installed in a frame for retaining and fixing the lens 1, from the direction shown by the thick arrow in the figure. The spherical surface (lens-side abutting section) 1b of the lens 1 is designed to come in abutment, upon the installation, with an intraframe projecting end (frame-side abutment section) projected in the frame 11.

Figures 2, 3:
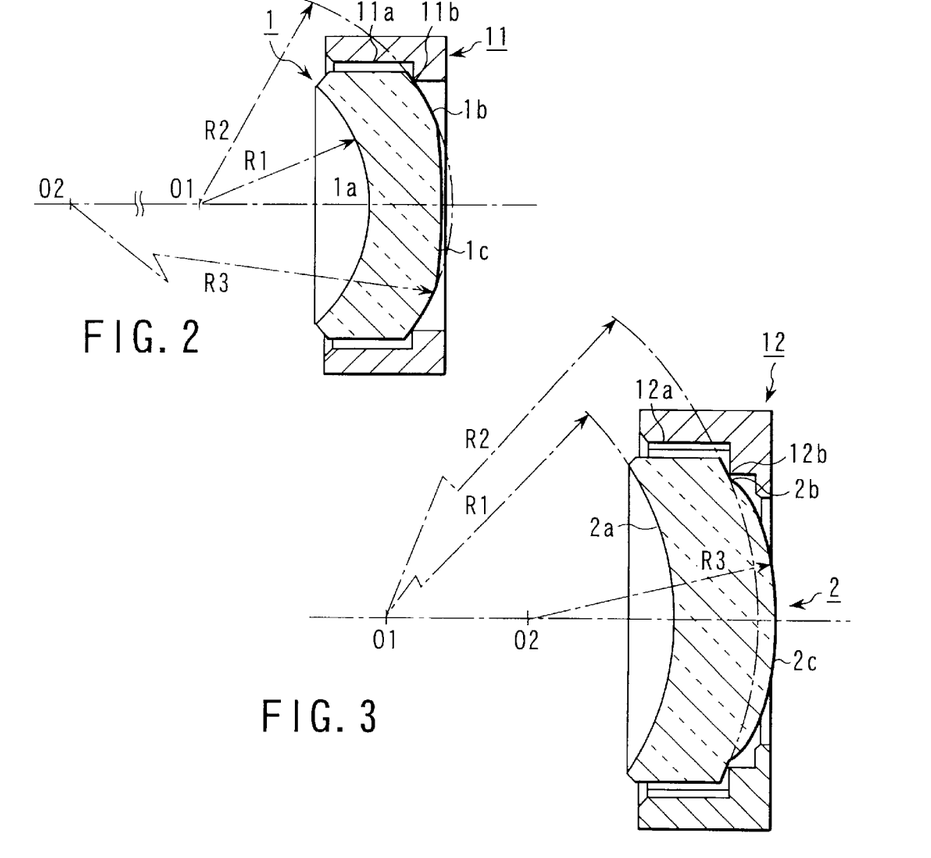
FIG. 2 is a sectional view showing how the lens according to the first embodiment illustrated in FIG. 1 is fixed in the lens frame.
FIG. 3 is a sectional view showing a lens as a second embodiment of the present invention and also showing how this lens is integrated with the lens frame.

The sectional view shown in FIG. 2 shows how the lens 1 illustrated in FIG. 1 is supported and fixed in the frame 11. That is, the lens 1 according to the first embodiment has two optical characteristic surfaces (a surface of a predetermined radius: a first optical characteristic surface 1a and a surface of a predetermined radius: a second optical characteristic surface 1c). The lens 1 is an optical element located to have a predetermined effective radius so that these lens surfaces 1a, 1c are mutually opposed as optical surfaces. One of these two optical characteristic surfaces 1a, 1c (that is, the first optical characteristic surface 1a) is formed of a predetermined spherical surface, while the other (that is, the second optical characteristic surface 1c) has a spherical portion (a surface of a predetermined radius: a ring-shaped surface) 1b formed around the second optical characteristic surface 1c and having the same center as the first optical characteristic surface 1a.

Specifically, the lens 1 is an optical element including the main first optical characteristic surface 1a of a radius R1 (the surface of the radius R1) having a center O1 on the optical axis and the second optical characteristic surface 1c of a radius R3 (the surface of the radius R3) having a center O2 on the same optical axis. Furthermore, the lens 1 includes a lens surface 1b of a radius R2 (a surface of the radius 2: the spherical portion, that is, the ring-shaped surface) having the same center O1 as the first optical characteristic surface 1a.

The main first optical characteristic surface 1a has such optical characteristics that its decentering more significantly affects lens performance than the second optical characteristic surface 1c. That is, manufacturing errors in the first optical characteristic surface 1a affect the optical characteristics of the lens more than those in the second optical characteristic surface 1c.

The lens 1 and the frame 11 are designed to align substantially concentrically when a corner (an intraframe projecting end 11b) contiguous to an intraframe peripheral surface 11a in the frame 11 comes in abutment with the ring-shaped spherical surface 1b to support the lens 1. An appropriate very small gap required for assembly is formed between an outer diameter portion of the lens 1 and the intraframe peripheral surface 11a. Thus, the position of the lens 1 is variably determined within the size of this gap.

In this case, however, if fine-tuning ("centering" of the second optical characteristic surface 1c with respect to the frame 11) for the positioning is required, the corner (11b) can be slightly shifted while maintaining its abutment with the spherical portion 1b. Subsequently, once the lens 1 and the frame 11 have been mutually aligned through predetermined fine-tuning such as alignment thereof on the same axis, an adhesive is injected into the gap between the intraframe peripheral surface 11a and a periphery of the lens 1 for integral fixation.

According to the point of the present invention, the lens 1 is designed to be supported at the surface (1b) having the same center as the main first spherical surface (the first optical characteristic surface 1a) of the lens (1), that is, the "coaxial and concentric surface". That is, this embodiment is characterized in that the support surface on the lens 1 side (the ring-shaped surface 1b) is annularly formed around the second spherical surface (the second optical characteristic surface 1c) opposed to the main first spherical surface (the first optical characteristic surface 1a).

Due to this characteristic shape of the lens, the first spherical surface (1a) has the same center as the support surface (1b) supported by the corner of the intraframe peripheral surface 11a, so that even if the support point is displaced within the support surface (1b) of the supported spherical surface, the main first spherical surface (1a) is prevented from having its center shifted from the optical axis when following the displacement, thereby maintaining the coaxial property.

Thus, if fine-tuning is required for positioning during assembly, it is possible to restrain degradation of optical performance originating from the positioning or the like even if the lens (1) is shifted from the predetermined designed support point (11b), as long as the shift is within the preset "amount of fitting backlash" between the lens (1) and the lens frame (11).

In this manner, the position where the lens according to the present invention is supported in abutment with the frame constituting the lens frame is the spherical surface 1b annularly formed outside the lens diameter (effective diameter) and the center O1 of the spherical portion 1b is substantially present on the optical axis at the center O1 of the first optical characteristic surface 1a that is the main spherical surface 1b. In addition, since this structure includes a small amount of backlash, no decentering component is generated in the first optical characteristic surface 1a with respect to an ideal optical axis even with a radial displacement that may occur if fine-tuning is enabled, that is, a "shift". Therefore, the accuracy of the optical system is not adversely affected by the positioning.

Methods for manufacturing the lens shaped as described above deviate from the spirits of the present invention and description thereof is thus omitted. Glass lenses, however, are produced using a conventional polishing process with simultaneous "centering". Plastic lenses are produced by means of a molding process using predesigned and preprocessed molds.

In addition, if the designed symmetry between the front and rear optical characteristic surfaces of the lens and the coaxial property are maintained within corresponding tolerances, even if a certain amount of shift occurs during adjustments in the positioning step, basic optical characteristics are not substantially affected because at least the main optical characteristic surface (the first optical characteristic surface 1a) and the frame 11 are maintained mutually coaxial.

This embodiment is particularly effective if decentering of the first optical characteristic surface 1a more significantly degrades the lens performance than decentering of the second optical characteristic surface 1c.

(Second Embodiment)

Figure 4:
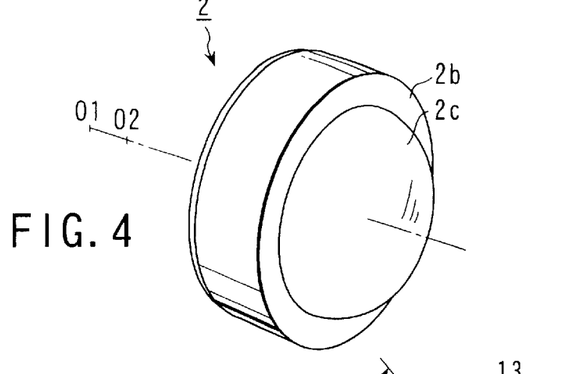
FIG. 4 is a perspective view showing an exterior of a lens according to the second embodiment.

FIG. 3 is a sectional view showing a lens 2 as a second embodiment of the present invention and also showing how the lens 2 is integrated with a frame 12 for supporting the lens 2. In addition, FIG. 4 shows an exterior of the lens 2.

Optical characteristic surfaces 2a, 2c of the lens 2 are designed to be centered at different points O1, O2 on an optical axis and constitute main first and second optical characteristic surfaces corresponding the front and rear of the lens 2, respectively. Furthermore, one 2c of the optical characteristic surfaces has a spherical portion (a lens-side abutting section) 2b formed in a peripheral portion thereof and centered at that point O1 on the optical axis of the other optical characteristic surface 2a which is different from the center of the optical characteristic surface 2c, the spherical portion being annularly formed as shown in FIG. 4.

In addition, the lens 2, which is characteristically shaped to project in the form of a sphere, is installed in the frame 12 for retaining and fixing the lens 2. The spherical portion 2b of the lens 2 is designed to come in abutment, upon the installation, with an intraframe projecting end (frame-side abutment section) 12b projected in the frame 12.

The shape of the lens 2 will be explained in further detail. The sectional view shown in FIG. 3 shows how the lens 2 illustrated in FIG. 4 is supported and fixed in the frame 12. That is, the lens 2 according to the second embodiment has two optical characteristic surfaces (a surface of a predetermined radius: a first optical characteristic surface 2a and a surface of a predetermined radius: a second optical characteristic surface 2c). The lens 2 is an optical element located to have a predetermined effective radius so that these lens surfaces are mutually opposed as optical surfaces. One of these two optical characteristic surfaces (that is, the first optical characteristic surface 2a) is formed of a predetermined spherical surface, while the other (that is, the second optical characteristic surface 2c) has a spherical portion (a surface of a predetermined radius: a ring-shaped surface) 2b formed, for example, like a ring around the second optical characteristic surface 2c and having the same center as the first optical characteristic surface 2a.

In fact, the lens 2 is an optical element including a surface 2a of a radius R1 (the first optical characteristic surface) having a center O1 on the optical axis and a surface 2c of a radius R3 (the second optical characteristic surface) having a center O2 on the same optical axis. Furthermore, the lens 2 includes a lens surface 2b of a radius (a surface of the radius 2: the spherical portion, that is, the ring-shaped surface) having the same center O1 as the first optical characteristic surface 2a.

The lens 2 and the frame 12 are designed to align substantially concentrically when a corner (an intraframe projecting end 12b) contiguous to an intraframe peripheral surface 12a in the frame 12 comes in abutment with the ring-shaped spherical surface 2b to support the lens 2. In this case, however, if fine-tuning ("centering" of the second optical characteristic surface 2c with respect to the frame 12) for the positioning is required, the corner (12b) can be slightly shifted while maintaining its abutment with the spherical portion 2b. Once the lens 2 and the frame 12 have been mutually aligned through predetermined fine-tuning such as alignment thereof on the same axis, a predetermined adhesive is injected into the gap between the intraframe peripheral surface 12a and a periphery of the lens for integral fixation.

The main first optical characteristic surface 2a has such optical characteristics that its decentering more significantly affects lens performance than the second optical characteristic surface 2c. That is, manufacturing errors in the first optical characteristic surface 2a affect optical characteristics more significantly than those in the second optical characteristic surface 2c.

According to the second embodiment, the lens 2 is shaped to be supported at the spherical surface (2b) having the same center as the main first spherical surface (2a), that is, the "coaxial and concentric spherical surface". That is, this embodiment is characterized in that the support surface (2b)

on the lens 2 side is annularly formed around the second spherical surface (2c) opposed to the main first spherical surface (2a).

Due to this characteristic shape of the lens, the first spherical surface (2a) has the same center as the surface (2b) supported by the corner of the intraframe peripheral surface 12a, so that even if the support point is displaced within the supported spherical surface (2b), the main first spherical surface (2a) is prevented from having its center O1 shifted from the optical axis when following the displacement, thereby maintaining the coaxial property of the optical system.

Thus, if fine-tuning is required for positioning during assembly, it is possible to restrain degradation of optical performance originating from the positioning or the like even if the lens (2) is shifted from the predetermined designed support point, as long as the shift is within the preset "amount of fitting backlash" between the lens (2) and the lens frame (12).

In this manner, since this structure is provided with an amount of backlash beforehand, decentering components are never generated in the first optical characteristic surface 2a even with a radial displacement (shift) that may occur if fine-tuning is enabled, thereby preventing the accuracy of the optical system from being adversely affected.

The lens shaped as described above according to the second embodiment is manufactured using a conventional polishing or molding process. In addition, if the optical characteristic surfaces of the lens are symmetrical and coaxial, even if a certain amount of shift occurs in the positioning step during assembly, the main optical characteristic surface (first optical characteristic surface 2a) and the frame 12 are maintained coaxial and basic optical characteristics are not substantially affected.

This embodiment is particularly effective if decentering of the first optical characteristic surface 2a more significantly degrades the lens performance than decentering of the second optical characteristic surface 2c.

(Third Embodiment)

Figure 5:
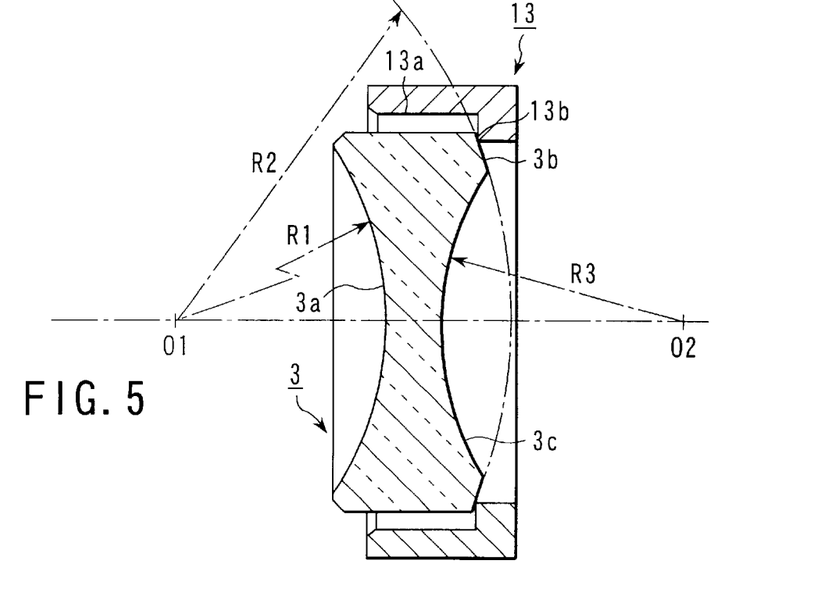
FIG. 5 is a sectional view showing a lens as a third embodiment of the present invention and also showing how this lens is integrated with the lens frame.
Figure 6:
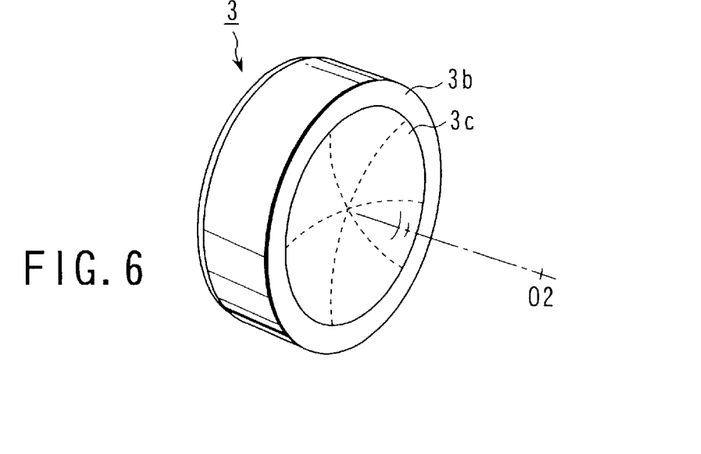
FIG. 6 is a perspective view showing an exterior of a lens according to the third embodiment.

FIG. 5 illustrates a lens 3 as a third embodiment of the present invention and also illustrates how the lens 3 is integrated with a frame 13. In addition, FIG. 6 shows an exterior of the lens 3.

Optical characteristic surfaces 3a, 3c of the concave lens 3 are designed to be centered at different points O1, O2 on an optical axis, respectively, and constitute two characteristic surfaces corresponding to the front and rear of the lens 3, respectively. Furthermore, one 3c of the optical characteristic surfaces has a spherical portion (a lens-side abutting section) 3b formed in a surrounding fashion and centered at that point O1 on the optical axis of the other optical characteristic surface 3a which is different from the center of the optical characteristic surface 3c, the spherical portion being annularly formed as shown in FIG. 6.

In addition, the lens 3, which is characteristically shaped to have its center bent in the form of a sphere as shown in the figure, is installed in the frame 13 for retaining and fixing the lens 2. The spherical portion 3b of the lens 3 is designed to come in abutment, upon the installation, with an intraframe projecting end (frame-side abutment section) 13b projected in the frame 13.

The shape of the lens 3 will be explained in further detail. The sectional view shown in FIG. 5 shows how the lens 3 illustrated in FIG. 6 is supported and fixed in the frame. That is, the concave lens 3 according to the third embodiment has two optical characteristic surfaces (a surface of a predetermined radius: a first optical characteristic surface 3a and a surface of a predetermined radius having a center position different from that of the first optical characteristic surface: a second optical characteristic surface 3c). The lens 3 is also a set of optical elements arranged to have a predetermined effective radius so that these surfaces are mutually opposed as optical characteristic surfaces. One of these two optical characteristic surfaces (the first optical characteristic surface 3a) is formed, for example, of a predetermined spherical surface, while the other (the second optical characteristic surface 3c) has a spherical portion (a surface of a predetermined radius, that is, a ring-shaped surface having the same center as the first optical characteristic surface 3a) 3b annularly formed around the second optical characteristic surface 3c and centered at the center O1 of the first optical characteristic surface 3a.

In fact, the lens 3 has on its opposite surfaces a lens surface 3a of a radius R1 (a surface of the radius R1: the first optical characteristic surface) having a center O1 on the optical axis and a lens surface 3c of a radius R3 (a surface of the radius R3: the second optical characteristic surface) having a center O2 on the same optical axis, as shown in FIG. 5. Furthermore, the lens 3 includes a lens surface 3b of a radius R2 (a surface of the radius 2, that is, the ring-shaped surface) formed, for example, like a ring around the lens surface (second optical characteristic surface) 3c and having the same center O1 as the first optical characteristic surface 3a.

The lens 3 and the frame 13 are designed to align substantially concentrically when a corner (an intraframe projecting end 13b) contiguous to an intraframe peripheral surface 13a in the frame 13 comes in abutment with the ring-shaped spherical surface 3b to support the lens 3. In this case, however, if fine-tuning ("centering" of the second optical characteristic surface 3c with respect to the frame 13) for the positioning is required, the corner (13b) can be slightly shifted while maintaining its abutment with the spherical portion 3b. Then, as described above, once the lens 3 and the frame 13 have been mutually aligned through predetermined fine-tuning such as alignment thereof on the same axis, a predetermined adhesive is injected into the gap between the intraframe peripheral surface 13a and a periphery of the lens 3 for integral fixation.

The main first optical characteristic surface 3a has such optical characteristics that its decentering more significantly affects lens performance than the second optical characteristic surface 3c. That is, manufacturing errors in the first optical characteristic surface 3a affect optical characteristics more significantly than those in the second optical characteristic surface 3c.

According to the third embodiment, the lens 3 is shaped to be supported at the spherical surface (3b) having the same center as the main first spherical surface (3a) constituting the concave surface, the spherical surface (3b) acting as the "coaxial and concentric spherical surface". Additionally, the spherical surface (3b) acting as the support surface is annularly formed around the second spherical surface (3c) opposed to the main first spherical surface (3a).

Due to this characteristic shape of the lens, the first spherical surface (3a) has the same center as the surface (3b) supported by the corner of the intraframe peripheral surface 13a, so that even if the support point is displaced within the supported spherical surface (3b), the main first spherical surface (3a) is prevented from having its center shifted from the optical axis when following the displacement, thereby maintaining the coaxial property of the optical system.

Thus, if fine-tuning is required for positioning during assembly, it is possible to restrain degradation of optical performance originating from the positioning or the like even if the lens 3 is shifted from the predetermined designed support point, as long as the shift is within the preset "amount of fitting backlash" between the lens 3 and the lens frame 13.

In this manner, since this structure is provided with an amount of backlash beforehand, no decentering components are generated in the first optical characteristic surface 3a even with a radial displacement (shift) that may occur if fine-tuning is enabled, thereby preventing the accuracy of the optical system from being adversely affected. As a result, effects equivalent to the effects 1 described above are obtained.

The concave lens shaped as described above according to the third embodiment is also manufactured using a conventional polishing or molding process. In addition, if the main optical characteristic surfaces of the lens are symmetrical and coaxial, even if a certain amount of shift occurs in the positioning step during assembly, the main optical characteristic surface (first optical characteristic surface 2a) and the frame 12 are maintained coaxial and basic optical characteristics are not substantially affected. As a result, effects substantially equivalent to the effects 1 described above are obtained.

This embodiment is particularly effective if decentering of the first optical characteristic surface 3a more significantly degrades the lens performance than decentering of the second optical characteristic surface 3c.

(Fourth Embodiment)

Figure 7:
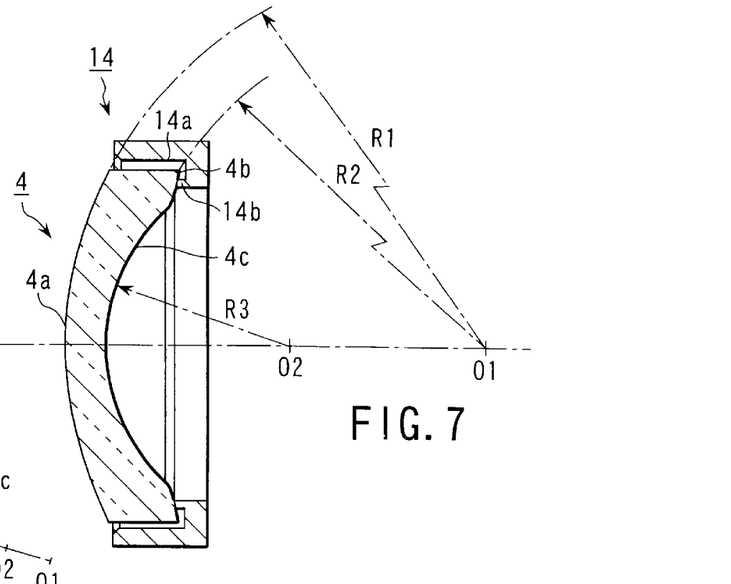
FIG. 7 is a sectional view showing a lens as a fourth embodiment of the present invention and also showing how this lens is integrated with the lens frame.
Figure 8:
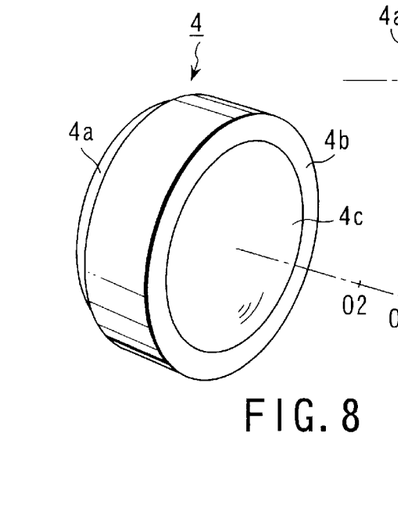
FIG. 8 is a perspective view showing an exterior of a lens according to the fourth embodiment.

Subsequently, FIG. 7 shows a concave lens 4 having a convex surface, as a third embodiment of the present invention, and also shows how the lens 4 is integrated with a frame 14. In addition, FIG. 8 shows an exterior of the lens 4.

Main optical characteristic surfaces 4a, 4c of the lens 4 are designed to be centered at different points O1, O2 on an optical axis, respectively, and constitute two characteristic surfaces corresponding to the front and rear of the lens 4, respectively. Furthermore, one 4c of the optical characteristic surfaces has a spherical portion (a lens-side abutting section) 4b formed in a surrounding fashion and centered at that point O1 on the optical axis of the other optical characteristic surface 4a which is different from the center of the optical characteristic surface 4c, the spherical portion being annularly formed as shown in FIG. 8.

In addition, the lens 4, which is characteristically shaped to have its one side projecting in the form of a sphere as shown in the figure, is installed in the frame 14 for retaining and fixing the lens 4. As shown in FIG. 7, the frame 14 has a substantially U-shaped cross section and has an intraframe projecting end (frame-side abutting section) 14b inside projected on the inner diameter side. The spherical portion 4b of the lens 4 is designed to come in abutment with the intraframe projecting end 14b when the lens 4 is aligned on the optical axis of the optical system in such a manner as to have its axis aligned with that of the frame 14.

The shape of the lens 4 will be explained in further detail. FIG. 7 shows how the lens 4, the exterior of which is shown in FIG. 8, is supported and fixed in the frame. That is, the concave lens 4 according to the fourth embodiment has two optical characteristic surfaces (a convex surface of a predetermined radius: a first optical characteristic surface 4a and a concave surface of a predetermined radius having a center position different from that of the first optical characteristic surface: a second optical characteristic surface 4c). The lens 4 is also a set of optical elements arranged to have a predetermined effective radius so that these two surfaces are mutually opposed as main optical characteristic surfaces. One of these two optical characteristic surfaces (the first optical characteristic surface 4a) is formed, for example, of a predetermined spherical surface, while the other (the second optical characteristic surface 4c) has a spherical portion (a surface of a predetermined radius, that is, a ring-shaped surface having the same center as the first optical characteristic surface 4a) 4b formed, for example, like a ring around the second optical characteristic surface 4c and having same center O1 as the first optical characteristic surface 4a.

With respect to the actual curvature of the lens 4, the lens 4 has on its opposite surfaces a lens surface 4a of a radius R1 (a surface of the radius R1: the first optical characteristic surface) having a center O1 on the optical axis and a lens surface 4c of a radius R3 (a surface of the radius R3: the second optical characteristic surface) having a center O2 on the same optical axis, as shown in FIG. 7. Furthermore, the lens 4 includes a lens surface 4b of a radius R2 (a surface of the radius 2, that is, the ring-shaped surface) annularly formed around the lens surface (second optical characteristic surface) 4c and having the same center O1 as the first optical characteristic surface 4a.

The lens 4 and the frame 14 are designed to align substantially concentrically when an intraframe projecting end 14b contiguous to an intraframe peripheral surface 14a in the frame 14 comes in abutment with the ring-shaped spherical surface 4b to support the lens 4. In this case, however, if fine-tuning (centering of the second optical characteristic surface 4c with respect to the frame 14) for the positioning is to be carried out, this corner (the intraframe projecting end 14b) can be slightly shifted while maintaining its abutment with the spherical portion 3b. Then, as described above, once the lens 4 and the frame 14 have been mutually aligned through predetermined fine-tuning such as alignment thereof on the same axis, an adhesive is injected into the gap between the intraframe peripheral surface 14a and a periphery of the lens 4 for integral fixation.

The main first optical characteristic surface 4a has such optical characteristics that its decentering more significantly affects lens performance than the second optical characteristic surface 4c. That is, manufacturing errors in the first optical characteristic surface 4a affect optical characteristics more significantly than those in the second optical characteristic surface 4c.

According to the fourth embodiment, the lens 4 is shaped to be supported at the spherical surface (4b) having the same center as the main first spherical surface (4a) constituting the convex surface on one side thereof, the spherical surface (4b) acting as the "coaxial and concentric spherical surface". Additionally, the spherical surface (4b) acting as the support surface is annularly formed around the second spherical surface (4c) opposed to the main first spherical surface (4a).

Due to this characteristic shape of the lens, the first spherical surface (4a) has the same center as the surface (4b) supported by the corner of the intraframe peripheral surface 14a, so that even if the support point is displaced within the supported spherical surface (4b), the main first spherical surface (4a) is prevented from having its center shifted from the optical axis when following the displacement, thereby maintaining the coaxial property of the optical system.

Thus, if fine-tuning is required for positioning during assembly, it is possible to restrain degradation of optical performance even if the lens 4 is shifted from the predetermined designed support point, as long as the shift is within the preset "amount of fitting backlash" between the lens 4 and the lens frame 14.

In addition, since this structure is provided with an amount of backlash beforehand, no decentering components are generated in the first optical characteristic surface 4a even with a radial displacement (shift) that may occur if fine-tuning is enabled, thereby preventing the accuracy of the optical system from being adversely affected. As a result, effects equivalent to the effects 1 described above are obtained.

The concave lens projecting to one side thereof and shown in the fourth embodiment is also manufactured using a conventional polishing or molding process. In addition, if the main optical characteristic surfaces of the lens are symmetrical and coaxial, even if a certain amount of shift occurs in the positioning step during assembly, the main optical characteristic surface (first optical characteristic surface 4a) and the frame 14 are maintained coaxial and basic optical characteristics are not substantially affected. As a result, effects equivalent to the effects 1 described above are obtained.

This embodiment is particularly effective if decentering of the first optical characteristic surface 4a more significantly degrades the lens performance than decentering of the second optical characteristic surface 4c.

(Fifth Embodiment)

Figure 9:
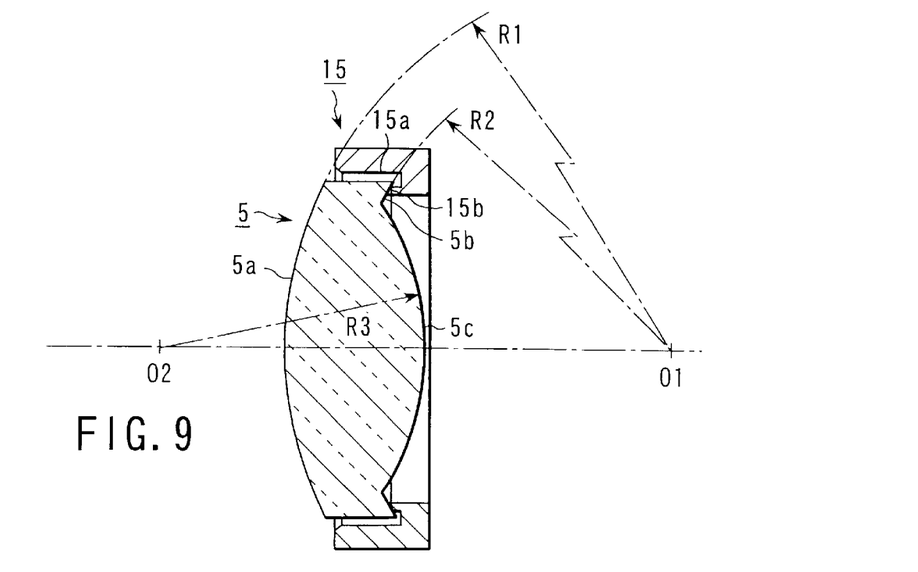
FIG. 9 is a sectional view showing a lens as a fifth embodiment of the present invention and also showing how this lens is integrated with the lens frame.
Figure 10:
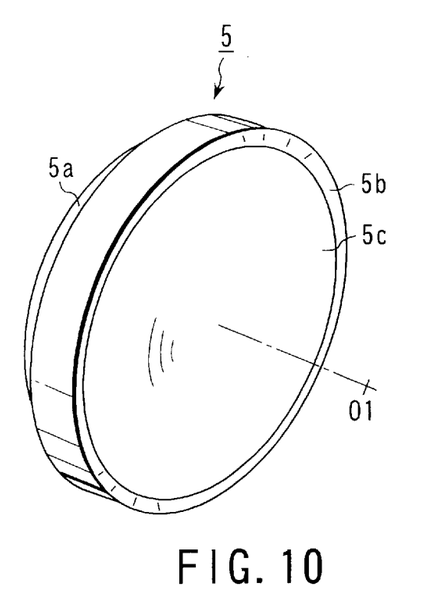
FIG. 10 is a perspective view showing an exterior of a lens according to the fifth embodiment.

FIG. 9 shows a convex lens 5 as a fifth embodiment of the present invention and also shows how the lens 5 is integrated with a frame 15. In addition, FIG. 10 shows an exterior of the lens 5.

Main optical characteristic surfaces 5a, 5c of the lens 5 are designed to be centered at different points O1, O2 on an optical axis, respectively, and constitute two characteristic surfaces corresponding to the front and rear of the lens 5, respectively. Furthermore, one 5c of the optical characteristic surfaces has a spherical portion (a lens-side abutting section) 5b formed in a surrounding fashion and centered at that point O1 on the optical axis of the other optical characteristic surface 5a which is different from the center of the optical characteristic surface 5c, the spherical portion being annularly formed as shown in FIG. 10.

In addition, the lens 5, which is characteristically shaped to have its one side projecting in the form of a sphere as shown in the figure, is installed in the frame 15 for retaining and fixing the lens 5. As shown in FIG. 9, the frame 15 has a substantially U-shaped cross section and has an intraframe projecting end (frame-side abutting section) 15b inside projected on the inner diameter side. The spherical portion 5b of the lens 5 is designed to come in abutment with the intraframe projecting end 15b when the lens 5 is aligned on the optical axis of the optical system in such a manner as to have its axis aligned with that of the frame 15.

The shape of the lens 5 will be explained in further detail. FIG. 9 shows how the lens 5, the exterior of which is shown in FIG. 10, is supported and fixed in the frame. That is, the convex lens 5 according to the fifth embodiment has two optical characteristic surfaces (a convex surface of a predetermined radius: a first optical characteristic surface 5a and a convex surface of a predetermined radius having a center position different from that of the first optical characteristic surface: a second optical characteristic surface 5c). The lens 5 is also a set of optical elements arranged to have a predetermined effective radius so that these two surfaces are mutually opposed as optical characteristic surfaces. One of the two optical characteristic surfaces (the first optical characteristic surface 5a) is formed, for example, of a predetermined spherical surface, while the other (the second optical characteristic surface 5c) has a spherical portion (a surface of a predetermined radius, that is, a ring-shaped surface having the same center as the first optical characteristic surface 5a) 5b formed, for example, like a ring around the second optical characteristic surface 5c and having same center O1 as the first optical characteristic surface 5a.

With respect to the actual curvature of the lens 5, the lens 4 has on its opposite surfaces a lens surface 5a of a radius R1 (a surface of the radius R1: the first optical characteristic surface) having a center O1 on the optical axis and a lens surface 5c of a radius R3 (a surface of the radius R3: the second optical characteristic surface) having a center O2 on the same optical axis, as shown in FIG. 9. Furthermore, the lens 5 includes a lens surface 5b of a radius R2 (a surface of the radius 2, that is, the ring-shaped surface) annularly formed around the lens surface (second optical characteristic surface) 5c and having the same center O1 as the first optical characteristic surface 5a.

The lens 5 and the frame 15 are designed to align substantially concentrically when an intraframe projecting end 15b of the frame 14 comes in abutment with the ring-shaped spherical surface 5b to support the lens 5. Of course, in this case, if fine-tuning ("centering" of the second optical characteristic surface 5c with respect to the frame 15) for the positioning is to be carried out, this corner (the intraframe projecting end 15b) can be slightly shifted while maintaining its abutment with the spherical portion 5b. Then, as described above, once the lens 5 and the frame 15 have been mutually aligned through predetermined fine-tuning such as alignment thereof on the same axis, an adhesive is injected into the gap between the intraframe peripheral surface 15a and a periphery of the lens 5 for integral fixation.

The main first optical characteristic surface 5a has such optical characteristics that its decentering more significantly affects lens performance than the second optical characteristic surface 5c. That is, manufacturing errors in the first optical characteristic surface 5a affect optical characteristics more significantly than those in the second optical characteristic surface 5c.

According to the fifth embodiment, the lens 5 is shaped to be supported at the spherical surface (5b) having the same center as the main first spherical surface (5a) constituting the convex surface described above, the spherical surface (5b) acting as the "coaxial and concentric spherical surface". Additionally, the spherical surface (5b) acting as the support surface is annularly formed around the second spherical surface (5c) opposed to the main first spherical surface (5a).

Due to this characteristic shape of the lens, the first spherical surface (5a) has the same center as the surface (5b) supported by the corner of the intraframe peripheral surface 15a, so that even if the support point is displaced within the supported spherical surface (5b), the first spherical surface (5a) is prevented from having its center shifted from the optical axis when following the displacement, thereby maintaining the coaxial property of the optical system.

Thus, if fine-tuning is required for positioning during assembly, it is possible to restrain degradation of optical performance even if the lens 5 is shifted from the predetermined designed support point, as long as the shift is within the preset "amount of fitting backlash" between the lens 5 and the lens frame 15.

In addition, since this structure is provided with an amount of backlash beforehand, no decentering components are generated in the first optical characteristic surface 5a even with a radial displacement (shift) that may occur if fine-tuning is enabled, thereby preventing the accuracy of the optical system from being adversely affected. As a result, effects substantially equivalent to the effects 1 described above are obtained.

The concave lenses projecting to one side thereof and shown in the fifth embodiment are also manufactured using a conventional polishing or molding process. In addition, if the main optical characteristic surfaces of the lens are symmetrical and coaxial, even if a certain amount of shift occurs in the positioning step during assembly, the main optical characteristic surface (first optical characteristic surface 5a) and the frame 15 are maintained coaxial and basic optical characteristics are not substantially affected. As a result, effects equivalent to the effects 1 described above are obtained.

This embodiment is particularly effective if decentering of the first optical characteristic surface 5a more significantly degrades the lens performance than decentering of the second optical characteristic surface 5c.

The first to fifth embodiments described above may be modified as follows: For example, the detailed shape of the lens may be changed as appropriate depending on a method for supporting the frame with which the lens is integrated, a combination of optical equipment used or optical elements thereof, on a method for manufacturing the optical equipment or optical elements thereof.

In addition, the first to fifth embodiments have been described with respect to the example in which the lens surface is spherical, but the present invention is also applicable to a "non-spherical surface" that is not exactly spherical or an "approximate spherical surface" that has a predetermined deviation from a predetermined spherical surface.

Both the spherical surfaces and the non-spherical surfaces are point-symmetrical with respect to the optical axis, and the non-spherical surfaces or approximate spherical surfaces can be essentially expressed by equations including a difference from the radius of a predetermined spherical surface or a displacement from a spherical center. Consequently, these surfaces can be dealt with similarly except for differences in design.

Therefore, effects equivalent to or higher than those of the above described first to fifth embodiments are expected.

(Sixth Embodiment)

Figure 11:
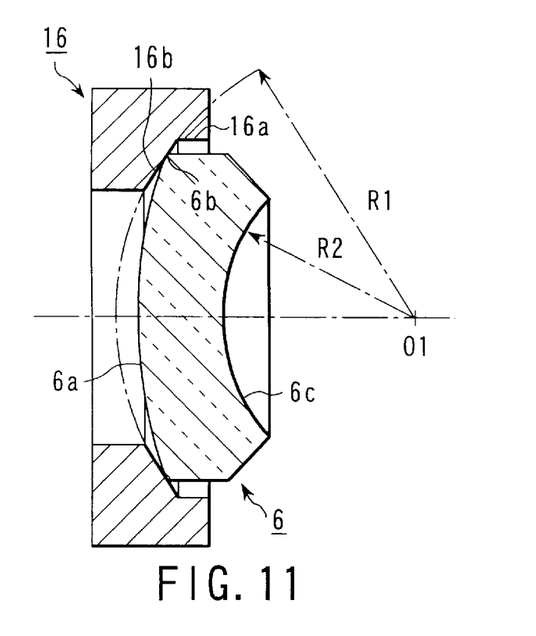
FIG. 11 is a sectional view showing how a lens frame as a sixth embodiment of the present invention retains a lens inside.

FIG. 11 shows a lens frame 16 for retaining a lens 6 according to a sixth embodiment of the present invention. A set of optical elements comprising a lens frame (hereafter referred to a "lens frame" or simply referred to as a "frame") and a lens 6 are combined and assembled "coaxially" so as to have the same optical axis passing through an opening center of the frame 16. That is, the sectional view shown in FIG. 11 and showing an assembled state shows that the lens is fixedly supported in abutment with an inner surface of the lens frame 16.

The frame 16 according to the sixth embodiment has the lens 6 attached to an opening thereof so that an exposed portion thereof constitutes an effective diameter of the lens 6, the lens 6 comprising two optical characteristic surfaces (a surface of a predetermined radius: a first optical characteristic surface 6a and a surface of a predetermined radius: a second optical characteristic surface 6c). In the set of optical elements comprising the lens 6 and the frame 16, the lens surfaces are arranged for a predetermined curvature and effective diameter so as to be opposed as two optical characteristic surfaces. At least one of the two optical characteristic surfaces (the second optical characteristic surface 6c) comprises, for example, a spherical surface having a center at O1 on the optical axis. The other surface (the first optical characteristic surface 6a) opposed to the second optical characteristic surface 6c is also spherical in this example and has such a large curvature that its center is not shown.

A spherical end (a lens-side abutting section) 6b at a peripheral end of the first optical characteristic surface 6a is "annularly" formed in abutment with an intraframe surface (a support section: a frame-side abutting section) 16b constituting such a concave surface as has the same center as the second optical characteristic surface 6c. The support section 16b, however, may not be actually shaped to be a continuous concave surface but may be formed so as to support the lens 6 at a plurality of portions of the annular surface, that is, a plurality of (three) locations spaced at equal intervals (of, for example, 120°) around the annular concentric circle.

The curvature will be described in further detail. The intraframe surface 16b formed inside the frame 16 is a concave spherical surface of a radius R1 (a surface of the radius R1) having a center O1 on the optical axis. A concave lens surface of a radius R2 (a surface of the radius R2) having the same center O1 is designed to be opposed to the above described first optical characteristic surface). That is, the spherical end 6b of the lens 6 is designed so that when this corner (6b) contacts with the intraframe surface 16b of the frame 16 into integral abutment with the frame 16, the lens 6 and the frame 16 are aligned substantially coaxially.

An appropriate very small gap required for assembly is formed between an outer diameter portion of the lens 6 and the intraframe peripheral surface 16a. Thus, the position of the lens 6 is variably determined within the size of this gap.

In this case, however, if fine-tuning for more accurate positioning is required, the spherical end 6b of the lens 6 can be slightly shifted while maintaining its abutment with the intraframe surface 16b of the frame constituting the concave surface. Once the lens 6 and the frame 16 have been mutually aligned through predetermined fine-tuning such as alignment thereof on the same axis, an adhesive is injected into the gap between the intraframe peripheral surface 16a and a periphery of the lens 6 for integral fixation.

Figure 12:
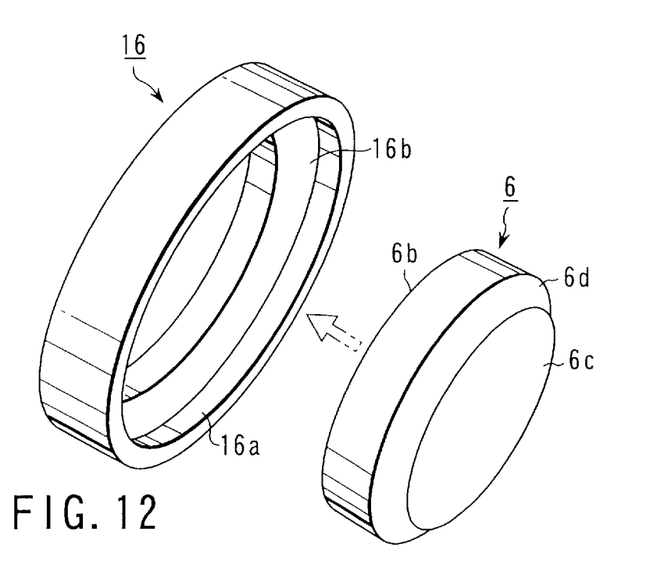
FIG. 12 is a perspective view showing the lens frame according to the sixth embodiment illustrated in FIG. 11 and the lens, which is about to be retained therein.

The frame 16, having its cross section characteristically shaped as shown in FIG. 11, externally appears as shown in FIG. 12. When the lens 6 is installed through the opening from the direction shown by the thick arrow in the figure, the spherical end 6b of the lens 6 first passes through the intraframe peripheral surface 16a and comes in abutment with the concave intraframe surface 16b formed in the frame 16. Then, the support point, which comes in abutment with the lens 6, forms a continuous ring. After the lens 6 has been received on the intraframe surface 16b in this manner, the frame 16 is finely adjusted as required to align its axis on the optical axis of the optical system for assembly. As a result, the lens frame 16 is integrated with the lens 6 as a frame for fixedly retaining the lens at the correct position.

According to the sixth embodiment, to support and retain the lens 6 inside, the frame 16 acting as the lens support frame is implemented, which is characterized in that the surface (the intraframe surface 16b) for receiving the lens 6 is, for example, concave. In this case, the frame 16 particularly supports the lens 6 having the two opposed spherical surfaces 6a, 6c, that is, the lens 6 having the spherical surface 6a acting as the first optical characteristic surface projected on the intraframe surface 16b side and the spherical surface 6c acting as the second optical characteristic surface recessed on the intraframe surface 16b side. In this case, the intraframe surface 16b formed in the frame 16 and constituting the spherical surface is designed to have its spherical center at the center O1 on the optical axis, that is, at the spherical center of the spherical surface 6c acting as the second optical characteristic surface of the lens 6. Consequently, even if the lens 6 moves slightly while maintaining its abutment with the frame, the corner (the spherical end 6b) is displaced only along the intraframe surface 16b, which supports the lens 16.

That is, since the spherical end 6b, including the supported point, is displaced around the same spherical center O1 as the spherical surface 6c acting as the second optical characteristic surface of the lens 6, at least the spherical surface 6c acting as the main second optical characteristic surface does not have its spherical center O1 shifted from the optical axis when following the displacement, thereby maintaining the coaxial property.

Due to this characteristic shape of the lens frame 16 and lens 6, if fine-tuning is required for positioning during assembly, it is possible to significantly restrain degradation of optical performance even if the lens 6 is shifted from the predetermined designed support point for the positioning, as long as the shift is within the preset "amount of fitting backlash" between the lens 6 and the lens frame 16. The extent that supported lens 6 can move is limited to the inside of the intraframe surface 16b annularly formed on the inner surface of the lens frame 16 and constituting the concave surface. Of course, this extent is outside the lens diameter (the effective diameter).

As describe above, according to the design meeting the geometrical condition that the concave surface constituting the intraframe surface 16b of the lens frame according to the sixth embodiment is substantially centered on the optical axis at the center O1 of the opposed lens spherical surface 6c, in a structure with an initial amount of backlash, no decentering components from the optical axis are generated even with a radial displacement (shift) that may occur if fine-tuning is enabled, thereby preventing the accuracy of the optical system from being adversely affected by this positioning.

This embodiment is particularly effective if decentering of the lens spherical surface 6c more significantly degrades the lens performance than decentering of the lens spherical surface 6a.

Methods for manufacturing the lens frame 16 shaped as described above are beyond the scope and spirits of the present invention and their detailed description is thus omitted; if, however, plastics is used as the material, a molding process is carried out using a preset and preprocessed mold.

Thus, if the designed symmetry and coaxial property of the frame 16 are maintained within tolerances, at least the main optical characteristic surface (spherical surface 6c) of the lens 6 and the intraframe surface 16b of the lens frame 16 are maintained coaxial even if the lens 6 shifts by a certain amount during adjustments in the positioning step, thereby substantially preventing basic optical characteristics from being adversely affected.

(Seventh Embodiment)

A lens frame illustrated below is an example having a geometric characteristic corresponding to a lens installed in the lens frame and shaped differently from the above described seventh embodiment.

Figure 13:
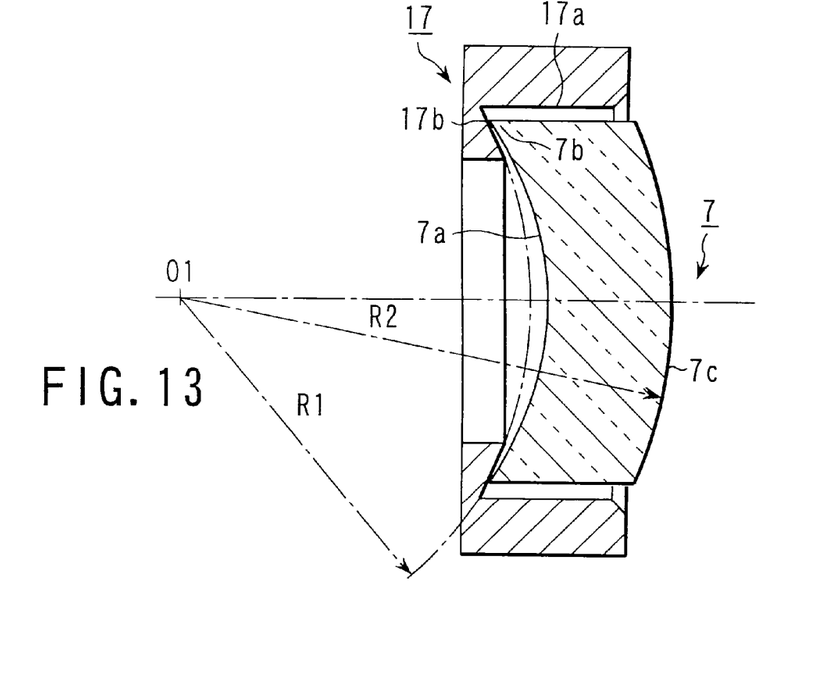
FIG. 13 is a sectional view showing a lens frame as a seventh embodiment of the present invention is retaining a lens inside.

FIG. 13 is a sectional view showing a lens retaining frame (a lens frame, simply referred to as a "frame") as a seventh embodiment of the present invention and also showing how the lens 7 is integrally supported by the frame 17.

A set of optical elements comprising the frame 17 and lens 7 according to the seventh embodiment are assembled coaxially so as to have the same optical axis passing through the center of an opening in the frame; when the frame 17 and the lens 7 are assembled, the lens 7 is fixedly supported in abutment with an inner surface of the frame 17, as shown in FIG. 13. In this case, the frame 17 supports the lens 7 on the optical axis passing through the center of the opening, the lens comprising a first optical characteristic surface 7a and a second optical characteristic surface 7c each having a predetermined radius.

In the set of optical elements comprising the lens 7 and the frame 17, these lens surfaces are arranged for a predetermined effective diameter so as to be opposed as two optical characteristic surfaces. At least one of the two optical characteristic surfaces (the second optical characteristic surface 7c) comprises, for example, a spherical surface having a center at O1 the an optical axis. The other surface (the first optical characteristic surface 7a) opposed to the second optical characteristic surface 7c is a recessed spherical surface such as one shown in the figure, which is different from that in the first embodiment.

A spherical end (a lens-side abutting section) 7b at a peripheral end of the first optical characteristic surface 7a is annularly formed in abutment with an intraframe surface (a support section: a frame-side abutting section) constituting a convex surface and having the same center as the spherical surface of the second optical characteristic surface. The actual support section 17b may not be shaped as a continuous convex surface but may be formed so that the lens 7 is supported, for example, on an annular surface (not shown), that is, at a plurality of (three) locations spaced at equal intervals of, for example, 120°. The curvature will be described in detail. The intraframe surface 17b formed inside the frame is a concave spherical surface of, a radius R1 (a surface of the radius R1) having a center O1 on the optical surface. A convex lens surface 7c of a radius R2 (a surface of the radius R2: the second optical characteristic surface) having the same center O1 is designed to be opposed to the first optical characteristic surface 7a. In addition, the set of the lens 7 and the frame 17 are designed to be aligned almost coaxially when the spherical end 7b of the lens 7 has its corner (7b) come in integral abutment with the intraframe surface 17b of the frame 17.

If, however, fine-tuning for more accurate positioning is required, the spherical end 7b of the lens 7 can be slightly shifted while maintaining its abutment with the intraframe surface 17b of the frame constituting the concave surface. Subsequently, once the lens 7 and the frame 17 have been mutually aligned through predetermined fine-tuning such as alignment thereof on the same axis, an adhesive is injected into the gap between the intraframe peripheral surface 17a and a periphery of the lens 7 for integral fixation.

Figure 14:
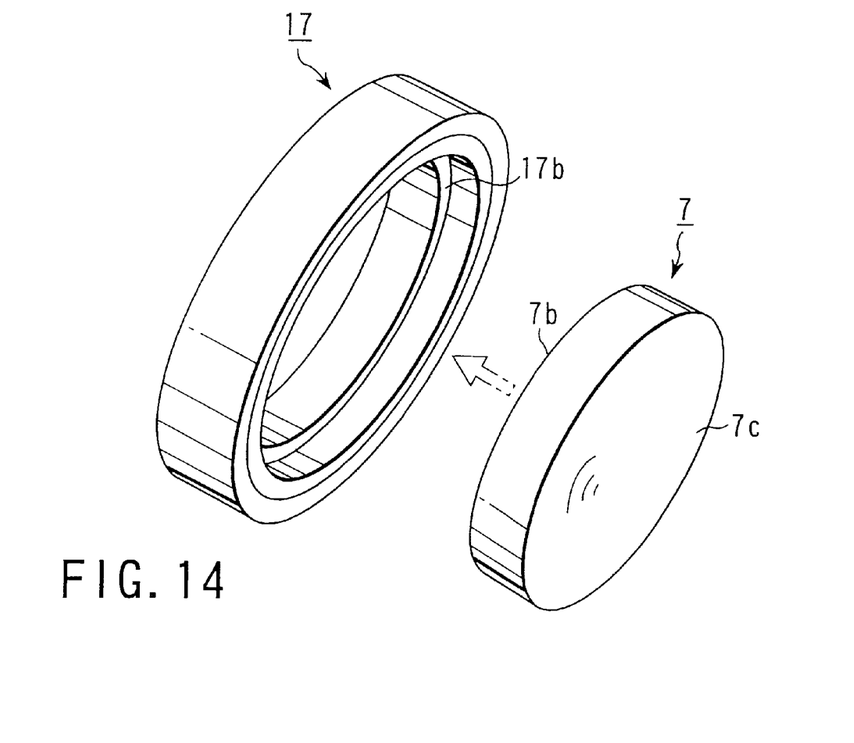
FIG. 14 is a perspective view showing the lens frame according to the seventh embodiment illustrated in FIG. 13 and the lens, which is about to be retained therein.

The frame 17, having its cross section characteristically shaped as shown in FIG. 13, externally appears as shown in FIG. 14. When the lens 7 is installed through the opening from the direction shown by the thick arrow in the figure, the spherical end 7b of the lens 7 first passes through the wide intraframe peripheral surface 17a and comes in abutment with the concave intraframe surface 17b formed in the frame 17. Then, the support point, which comes in abutment with the lens 7, forms a continuous ring. After the lens 7 has been received on the intraframe surface 17b in this manner, the frame 17 is finely adjusted as required to align its axis on the optical axis of the optical system for assembly. As a result, the lens frame 17 is integrated with the lens 7 as a frame for fixedly retaining the lens at the correct position.

According to the seventh embodiment, to support and retain the lens 7 inside, the lens frame acting as the lens support frame is implemented, which is characterized in that the surface for receiving the lens 6, that is, the intraframe surface 17b, is, for example, concave. In this case, if the frame 17 particularly supports the lens 7 having the two opposed spherical surfaces 7a, 7c, that is, the lens 6 having the first spherical surface 7a acting as the first optical characteristic surface recessed on the intraframe surface 17b side and the second spherical surface 7c acting as the second optical characteristic surface projected on the intraframe surface 17b side, then the intraframe surface 17b formed in the frame 17 and constituting a spherical surface has its spherical center at the center O1 on the optical axis, which is the same as the spherical center of the spherical surface 7c acting as the second optical characteristic surface of the lens 7. Due to this design, even if the lens 7 moves slightly while maintaining its abutment with the frame, the corner (the spherical end) 7b of the lens 7 is displaced only along the intraframe surface 17b, which supports the lens 17.

That is, since the spherical end 7b, including the supported point, is displaced around the same spherical center O1 as the spherical surface 7c acting as the second optical characteristic surface of the lens 7, at least the spherical surface 7c acting as the main second optical characteristic surface does not have its spherical center O1 shifted from the optical axis when following the displacement, thereby maintaining the coaxial property.

Thus, also in the seventh embodiment, due to this characteristic shape conforming to the lens 7 installed in the frame, if fine-tuning is required for positioning during assembly, it is possible to restrain degradation of optical performance even if the lens 7 is shifted from the predetermined designed support point, as long as the shift is within the preset "amount of fitting backlash" between the lens and the lens frame.

Additionally, according to the design meeting the geometrical condition that the concave surface constituting the intraframe surface 17b of the lens frame 17 is substantially centered on the optical axis at the center O1 of the opposed lens spherical surface 7c, in a structure with an amount of backlash, no decentering components from the optical axis are generated in the spherical surface 7c acting as the main second optical characteristic surface even with a radial displacement (shift) that may occur if fine-tuning is enabled, thereby preventing the accuracy of the optical system from being adversely affected by displacement associated with this positioning. Consequently, if the designed symmetry and coaxial property of the frame are maintained within tolerances, at least the main optical characteristic surface (spherical surface 7c) of the lens and the intraframe surface of the lens frame are maintained coaxial even if the lens shifts by a certain amount during adjustments in the positioning step, thereby substantially preventing basic optical characteristics from being adversely affected. That is, the seventh embodiment also provides effects substantially equivalent to the above described effects 6.

The sixth and seventh embodiments described above may be modified as follows: For example, although the lens 6 installed in the lens frame according to the sixth embodiment (see FIG. 11) has the convex first optical characteristic surface 6a in contact with the frame 16, this characteristic surface may be concave and the lens frame fits this lens without any modification.

In addition, for example, the detailed shape of the lens 6 may be changed as appropriate depending on a combination of optical equipment used or optical elements thereof or a method for manufacturing the optical equipment or optical elements thereof.

In addition, the first to fifth embodiments have been described with respect to the example in which the lens support surface (intraframe surface) formed in the lens frame is "spherical", but the present invention is also applicable to a "non-spherical surface" that is not exactly spherical or an "approximate spherical surface" that has a predetermined deviation from a predetermined spherical surface.

Both the spherical surfaces and the non-spherical surfaces are point-symmetrical with respect to the optical axis, and the non-spherical surfaces or approximate spherical surfaces can be essentially expressed by equations including a difference from the radius of a predetermined spherical surface or a displacement from a spherical center. Consequently, these surfaces can be dealt with similarly except for differences in design. Therefore, effects equivalent to or higher than those of the above described sixth and seventh embodiments are expected.

Various other variations are possible without deviating from the scope and spirits of the present invention.

As described above, according to the present invention can provide the lens wherein the fitting backlash is provided between the lens and the lens frame to enable positioning while restraining degradation of optical performance even if the lens shifts. The present invention can also provide the lens frame wherein the radial fitting backlash is provided between the lens and the lens frame to enable positioning while restraining degradation of optical performance even if the supported lens shifts.

Therefore, the present invention is effective in positioning the support structure comprising the lens and the lens frame while restraining degradation of optical performance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A support structure for positioning a lens in a retaining frame, the support structure comprising:

a lens member having two optical characteristic surfaces formed to oppose to each other in an optical axis direction and to have a light beam passed therethrough, the optical characteristic surfaces including a first optical characteristic surface comprising a first spherical surface having a spherical center at a first predetermined position on an optical axis and a second optical characteristic surface comprising a second spherical surface having a spherical center at a second predetermined position on the optical axis;

a lens-side abutting section that is formed on an outer circumferential portion of said second optical characteristic surface, and that is adapted to abut said retaining frame in the optical axis direction; and a frame-side abutting section that is formed in said retaining frame, and that is adapted to abut said lens-side abutting section, wherein one of said lens-side abutting section and said frame-side abutting section is formed of a third spherical surface having a center at a same position as said first predetermined position of the spherical center of said first optical characteristic surface on the optical axis.

2. A support structure for positioning a lens in a retaining frame according to claim 1, wherein:

said lens-side abutting section is formed of an annular contact section of a predetermined radius, and said frame-side abutting section is formed of said third spherical surface, and said third spherical surface is formed in a predetermined annular area so as to constantly abut said contact section forming said lens-side abutting section even if said lens member is displaced substantially perpendicularly to the optical axis, so that the center position of the first spherical surface of said first optical characteristic surface is located on the optical axis at all times without drifting therefrom.

3. A support structure for positioning a lens in a retaining frame according:to claim 1, wherein:

said frame-side abutting section has an annular contact section of a predetermined radius formed therein, and said lens-side abutting section is formed of said third spherical surface, and said third spherical surface is formed in a predetermined annular area so as to constantly abut said contact section forming said frame-side abutting section even if said lens member is displaced substantially perpendicularly to the optical axis, so that the center position of the first spherical surface of said first optical characteristic surface is located on the optical axis at all times without drifting therefrom.

4. A support structure for positioning a lens in a retaining frame, the support structure comprising:

a lens member having two opposed optical characteristic surfaces formed therein and through which a light beam is passed, said lens member including: (i) a first optical characteristic surface comprising a first spherical surface having a spherical center at a first predetermined position on an axial center of said retaining frame, and (ii) a second optical characteristic surface comprising a second spherical surface having a spherical center at a second predetermined position on the axial center of said retaining frame;

a lens-side abutting section that is formed on an outer circumferential portion of said second optical characteristic surface, and that is adapted to abut said retaining frame in a direction of said axial center; and a frame-side abutting section that is formed in said retaining frame, and that is adapted to abut said lens-side abutting section, wherein one of said lens-side abutting section and said frame-side abutting section comprises a third spherical surface having a center at a same position as said first predetermined position of the spherical center of said first optical characteristic surface on said axial center of said retaining frame.

5. A support structure for positioning a lens in a retaining frame, the support structure comprising:

a lens member having first and second opposed optical characteristic spherical surfaces through which a light beam is passed;

a spherical portion having a center at a predetermined position so as to form said first optical characteristic spherical surface; and an annular spherical portion formed on an outer circumferential portion of said second optical characteristic spherical surface, said annular spherical portion having a center which coincides with the center of the spherical portion said first optical characteristic spherical surface.

6. A support structure for positioning a lens in a retaining frame according to claim 5, wherein said second optical characteristic spherical surface comprises a spherical surface having a center at a position different from the center of the spherical portion of said first optical characteristic spherical surface.

7. A support structure for positioning a lens in a retaining frame according to claim 5, wherein manufacturing errors in said first optical characteristic spherical surface affect optical performance more significantly than manufacturing errors in said second optical characteristic spherical surface.

8. A support structure for positioning a lens in a retaining frame according to claim 5, further comprising an abutting section that is formed in said retaining frame, and that is adapted to abut said annular spherical portion in an optical axis direction to position the lens member.

9. A lens mounted in a retaining frame for positioning and support, the lens comprising:

first and second opposed optical characteristic surfaces through which a light beam is passed;

a first spherical portion having a center at a predetermined position so as to form said first optical characteristic surface;

a second spherical portion having a center at a different position from the center of the first spherical portion of said first optical characteristics surface so as to form said second optical characteristic surface; and an annular spherical portion formed on an outer circumferential portion of said second optical characteristic surface, said annular spherical portion having a center which coincides with the center of the first spherical portion of said first optical characteristic surface.

10. A support structure for positioning a lens in a retaining frame, the support structure comprising:

a lens member located so that a first optical characteristic surface and a second optical characteristic surface are mutually opposed in an optical axis direction to allow a light beam to pass therethrough;

wherein said first optical characteristic surface comprises one of a first non-spherical surface and a first approximate spherical surface; and wherein one of a second non-spherical surface and a second approximate spherical surface is annularly formed on said lens member on an outer peripheral portion of said second optical characteristic surface, said one of said second non-spherical surface and said second approximate spherical surface having a center which coincides with a center of said one of said first non-spherical surface and said first approximate spherical surface of said first optical characteristic surface.

11. A support structure for positioning a lens in a retaining frame according to claim 10, the support structure further comprising an abutting section that is formed in said retaining frame, and that is adapted to abut said one of said second non-spherical surface and said second approximate spherical surface annularly formed on the outer peripheral portion of said second optical characteristic surface to position the lens member.

12. A support structure for positioning a lens in a retaining frame, the support structure comprising:

a lens member having two optical characteristic surfaces mutually opposed in an optical axis direction and through which a light beam passes, the optical characteristic surfaces including a first optical characteristic surface comprising a first surface having a spherical center at a first predetermined position on an optical axis and a second optical characteristic surface comprising a second surface having a spherical center at a second predetermined position on the optical axis;

a lens-side abutting section having a contact section formed in an outer peripheral portion of said second optical characteristic surface, the lens-side abutting section being adapted to abut said retaining frame in the optical axis direction; and frame-side abutting section formed to have a third surface in said retaining frame in abutment with said lens-side abutting section, wherein said frame-side abutting section has a spherical center at a same position as said first predetermined position of the center of said first surface of said first optical characteristic surface.

13. A support structure for positioning a lens in a retaining frame according to claim 12, wherein said first surface and the third surface of the frame-side abutting section of said retaining frame are one of non-spherical surfaces and approximate spherical surfaces.

14. A support structure for positioning a lens in a retaining frame according to claim 12, wherein manufacturing errors in said first optical characteristic surface affect optical performance more significantly than manufacturing errors in said second optical characteristic surface.

15. A support structure for retaining and positioning a lens, the support structure comprising:

a lens member having first and second optical characteristic spherical surfaces formed to oppose to each other in an optical-axis direction and to have a light beam passed therethrough, and a spherical surface portion formed in an outer circumferential portion of the first optical characteristic spherical surface, said spherical surface portion having a center at a same position as a center of a spherical surface of the second optical characteristic spherical surface; and a retaining portion formed in a predetermined lens retaining portion, in abutment with the spherical surface formed in the outer circumferential portion of the first optical characteristic spherical surface.

16. A support structure for retaining and positioning a lens in a lens retaining member, the support structure comprising:

a lens member having two optical characteristic spherical surfaces formed to oppose to each other; and a retaining surface formed on said lens retaining member, and adapted to abut one of the opposing two optical characteristic spherical surfaces of said lens, wherein said retaining surface is formed in a spherical shape having a center at a same position as a center of a spherical surface of the other optical characteristic spherical surface.

17. A support structure for retaining and positioning a lens, the support structure comprising:

a lens retaining member for retaining the lens, wherein said lens retaining member comprises a retaining surface formed in a spherical shape having a center at a same position as a center of a spherical surface of one of two optical characteristic spherical surfaces of the lens retained, and said retaining surface has a curvature different from a curvature of the optical characteristic spherical surfaces of the lens.

* * * * *